United States Patent
Malaure et al.

(10) Patent No.: US 6,934,708 B2
(45) Date of Patent: Aug. 23, 2005

(54) METHOD AND APPARATUS FOR SAMPLING REMOTE DATA SOURCES

(75) Inventors: Jason Robert Malaure, Middlesex (GB); Richard Andrew Kydd, Middlesex (GB)

(73) Assignee: Two Way TV Limited, London (GB)

( * ) Notice: Subject to any disclaimer, the term of this patent is extended or adjusted under 35 U.S.C. 154(b) by 208 days.

(21) Appl. No.: 09/376,244

(22) Filed: Aug. 18, 1999

(65) Prior Publication Data

US 2003/0130978 A1 Jul. 10, 2003

(30) Foreign Application Priority Data

Aug. 28, 1998 (EP) ............................................. 98306950

(51) Int. Cl.7 .............................................. G06F 17/30
(52) U.S. Cl. ........................................ 707/10; 725/110
(58) Field of Search .................... 707/10, 1–6, 201–24; 709/247, 331, 224, 238; 463/9, 29, 42, 169, 350; 725/110, 119

(56) References Cited

U.S. PATENT DOCUMENTS

| | | | | |
|---|---|---|---|---|
| 4,592,546 A | * | 6/1986 | Fascenda et al. ............. 463/29 |
| 5,013,138 A | | 5/1991 | Roosen et al. ................ 349/107 |
| 5,120,076 A | * | 6/1992 | Luxenberg et al. ........... 463/42 |
| 5,519,433 A | * | 5/1996 | Lappington et al. ........ 725/110 |
| 5,537,143 A | * | 7/1996 | Steingold et al. ........... 725/119 |
| 5,716,273 A | * | 2/1998 | Yuen ............................ 463/29 |
| 5,813,913 A | * | 9/1998 | Berner et al. ................. 463/40 |
| 6,175,832 B1 | * | 1/2001 | Luzzi et al. .................. 707/10 |

FOREIGN PATENT DOCUMENTS

| | | | | |
|---|---|---|---|---|
| EP | 0745 412 A1 | | 12/1996 | |
| EP | WO-9719556 | * | 5/1997 | .......... H04N/7/173 |
| EP | WO-9807485 | * | 2/1998 | ............. A63F/9/22 |
| WO | WO 97/19556 | | 5/1997 | |
| WO | WO 98 07485 | | 2/1998 | |

* cited by examiner

*Primary Examiner*—Mohammad Ali

(57) ABSTRACT

A method of sampling, at a central location, data generated from a number of remote data sources. The method comprises:

a) causing those data sources with generated data to implement a local response function;

b) transmitting information from the central location to the remote data sources relating to the outcome of the local response function;

c) causing those data sources with generated data to determine whether the outcome of the local response function satisfies a predetermined relationship with the information transmitted from the central location, and, if it does, to transmit the generated data to the central location.

19 Claims, 3 Drawing Sheets

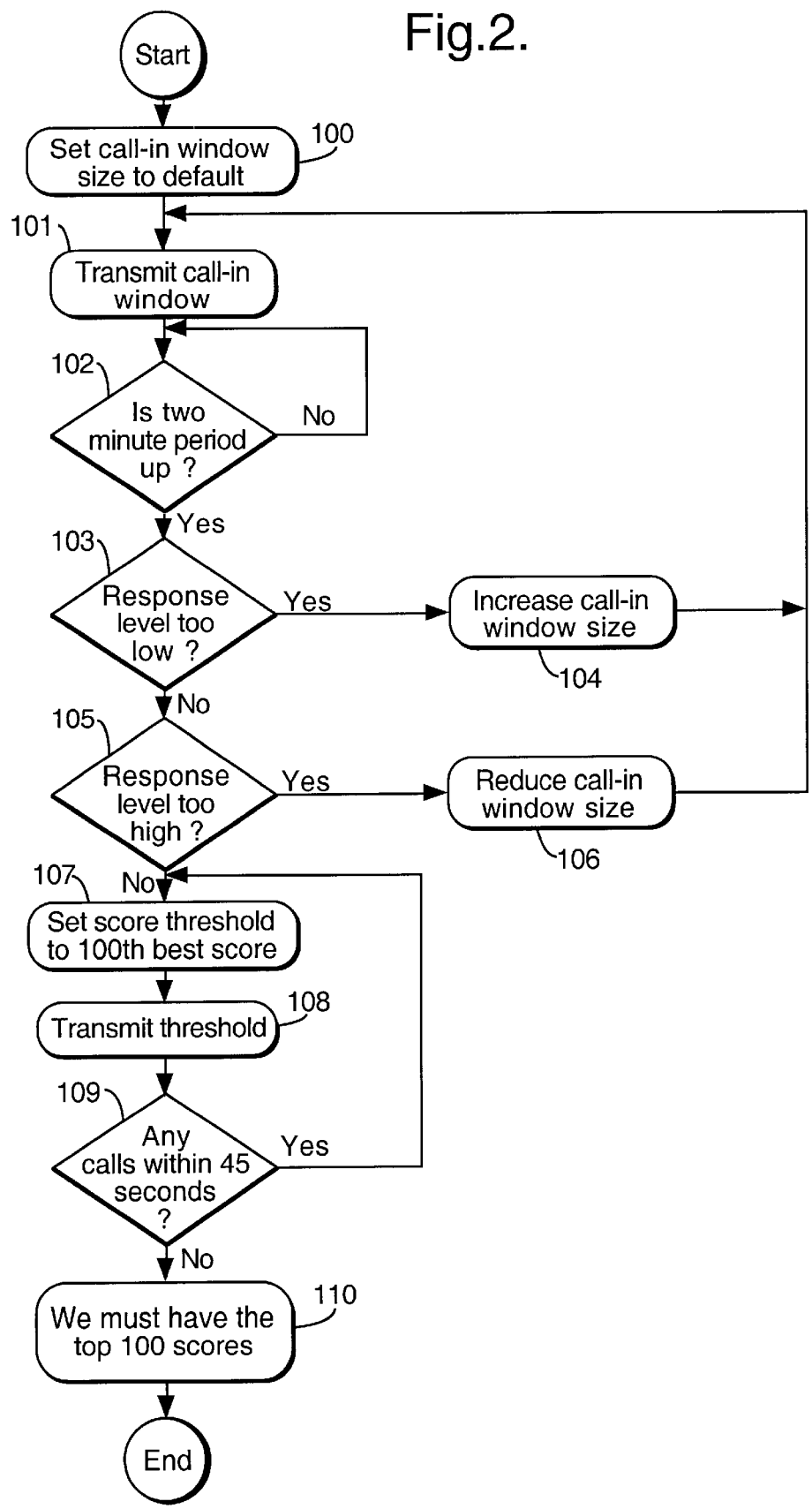

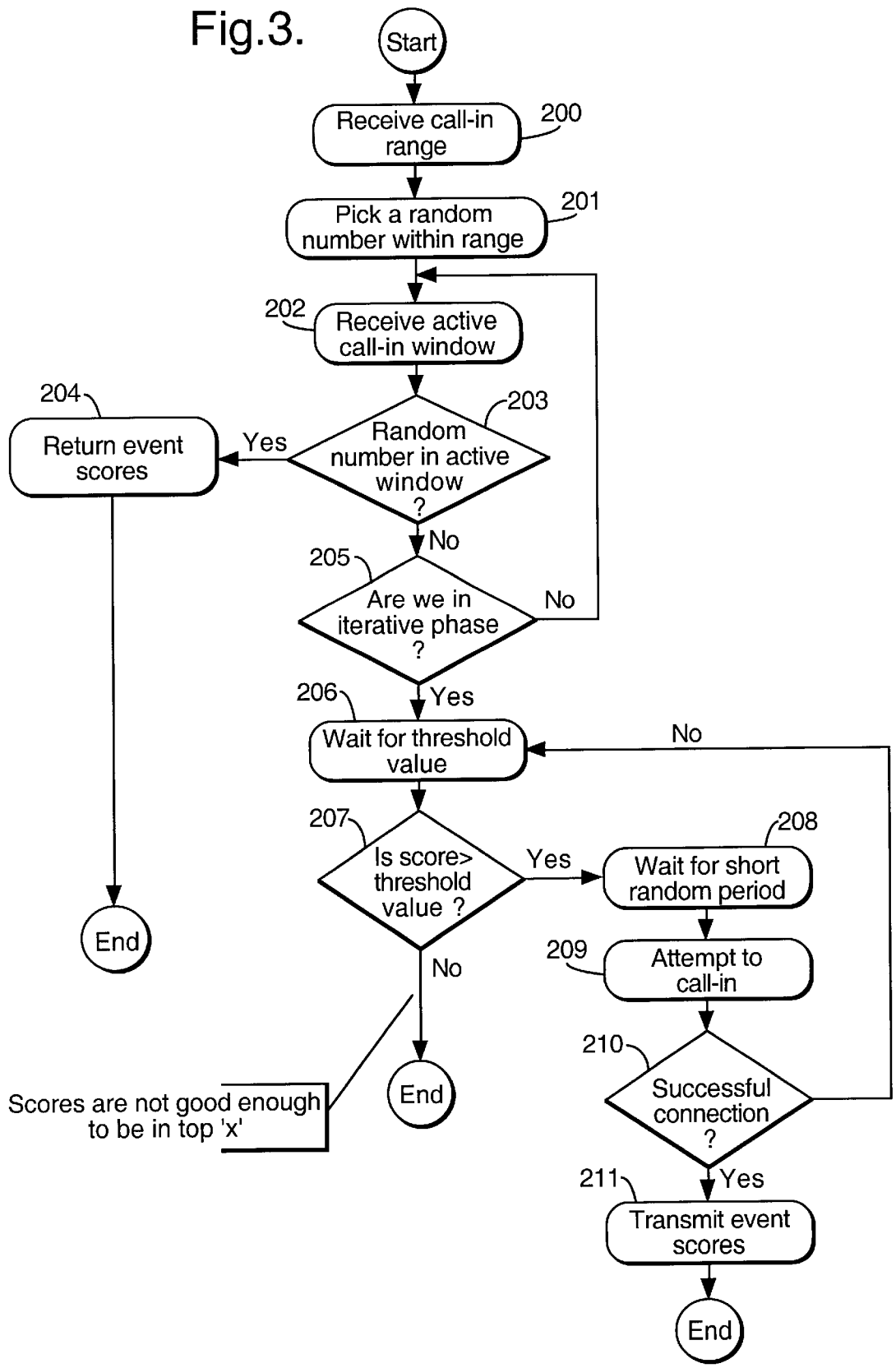

METHOD AND APPARATUS FOR SAMPLING REMOTE DATA SOURCES

FIELD OF THE INVENTION

The invention relates to a method and apparatus for sampling, at a central location, data generated from a number of remote data sources.

DESCRIPTION OF THE PRIOR ART

With the increasing ability to communicate at speed with a variety of remote data sources, there is an increasing need to find efficient systems for obtaining data from those sources for evaluation. A particularly important example of this is in game play applications in which a number of players at remote sites compete either directly or indirectly with each other in playing a game simultaneously. On completion of the game, the players wish to know as quickly as possible whether they have won or at least have a general indication of their level of success. The game may be solely locally generated, the game being played individually with scores being transmitted back to a central location for comparison or it may involve a degree of interactivity with data flow to and from the central location and the remote data sources during the playing of the game. Recently, games have been developed which relate to broadcast TV programs such as quiz shows which allow the remote users or players to compete with the same questions as in the quiz show.

As these applications become more popular, large numbers of remote data sources become involved in a single application or game. It is necessary to find a way of evaluating the game scores centrally as quickly as possible. The most straightforward approach is to require each remote data source to make contact with the central location individually, for example via the public switched telephone network or some other medium such as the Internet. However, it is conceivable that several thousand participants may be involved and the central location cannot cope with each of these supplying information substantially simultaneously. Receipt of all scores would take a long time or would require very expensive infrastructure that would only be used to its potential for a small percentage of the time together with the need for a significant degree of processing.

EP-A-0504267 describes a method of determining the winners of a game of skill without the need to input all the scores. Statistical sampling is used to upload scores from a small fraction of the remote players. Tentative winners are determined and a statistical curve is then downloaded to all the players and only those players who are equal or better than the winning score communicate their scores directly to the central location. This approach is based on the assumption that the central location can select a random pool of remote participants initially and request scores from them. However, in many situations, it is unlikely that the central location will know which remote data sources have participated in the game. In that situation, the techniques described in the prior art would not be suitable.

WO98/07485 describes a system in which each remote terminal is instructed to contact the central station if the locally generated score exceeds a threshold which is communicated to the remote stations. The central station has a limited number of telephone lines and if all of the telephone lines are dialled, this indicates that the threshold has been set too low and a further message will be sent setting a higher threshold. This initial process is continued until the top scores are identified.

SUMMARY OF THE INVENTION

In accordance with the present invention, a method of sampling, at a central location, data generated from a number of remote data sources comprises:

a) causing those data sources with generated data to implement a local response function;

b) transmitting information from the central location to the remote data sources relating to the outcome of the local response function;

c) causing those data sources with generated data to determine whether the outcome of the local response function satisfies a predetermined relationship with the information transmitted from the central location, and, if it does, to transmit the generated data to the central location.

With this invention, retrieval of data is restricted firstly to those remote data sources which have generated data, for example participated in the game, which is determined locally. In addition, a sample of those remote data sources is selected using the local response function. This use of a local response function contrasts with the method of WO98/07485.

In general, the method is not used to determine a final game position for each remote data source which has participated but instead will enable the remote data sources to at least to determine whether or not the locally generated data falls within a particular range, for example an upper quartile.

In some cases, the data returned to the central location initially is provided from a sufficiently large pool of remote data sources to enable a threshold defining percentile data such as the 5% percentile to be identified. Typically, however, the method further comprises:

d) comparing the transmitted data at the central location to generate threshold data, and transmitting the threshold data to all the remote data sources which generated data, for comparison with the locally generated data, the remote data sources transmitting their generated data to the central location if it satisfies a predetermined relationship with the threshold data.

This provides an iterative process in which the threshold data can be refined until a situation is reached in which the desired percentile threshold has been found. This can then be communicated to the remote data sources enabling them to determine whether or not the locally generated data falls within that percentile.

In some cases, the number of remote data sources which respond initially will be either too few or too many and preferably the method further comprises determining the number of remote data sources which have transmitted data to the central location, and, if this differs from a desired number, transmitting new information relating to the outcome of the local response function and repeating step c), the new information being chosen to result in the number of local data sources transmitting data being closer to the desired number.

The information which is transmitted will depend on the form of the local response function and the processing which can be carried out locally. In a simple case, the local response function is a random number generating function. In that case, the information which is transmitted can comprise a range of numbers selected from those numbers which could be generated by the random number generating function, step c) comprising determining whether the locally generated random number falls within the transmitted range. This is particularly convenient since the range can then be varied depending upon the number of remote data sources which respond. If there is a small number then the range can be increased and if there is a large number the range can be decreased. The range itself could be defined between upper and lower values which are transmitted or a single value could be transmitted defining an upper limit, the lower limit being zero.

In other cases, the information which is transmitted could be used locally to generate an outcome and not constitute the outcome itself.

The transmission of data from the central location to the remote users may be direct or indirect i.e. via multiple links/nodes etc.

The local response function is conveniently unrelated to the locally generated data since this enables its outcome to be more closely predicted. However, in other applications, the local response function could be related to the locally generated data and might comprise an algorithm which performs some function based on the locally generated data. This in turn could be a random number generating function.

As mentioned above, an important application of the invention is in the sampling of scores resulting from the playing of a game at the remote data sources. The game may be played in response to data transmitted from the central location together with locally generated instructions, for example as mentioned above in connection with a TV broadcast or the like. However, the game could also be wholly controlled locally and could even be played at a different time from the same game on other remote data sources providing the result of playing the game can be securely stored.

The invention is also applicable to other applications.

BRIEF DESCRIPTION OF THE DRAWINGS

An example of a method and apparatus according to the invention will now be described with reference to the accompanying drawings, in which:

FIG. 2 is a flow diagram illustrating operation of the central controller; and,

FIG. 3 is a flow diagram illustrating operation of a remote unit.

DETAILED DESCRIPTION OF AN EMBODIMENT

Figure 1:
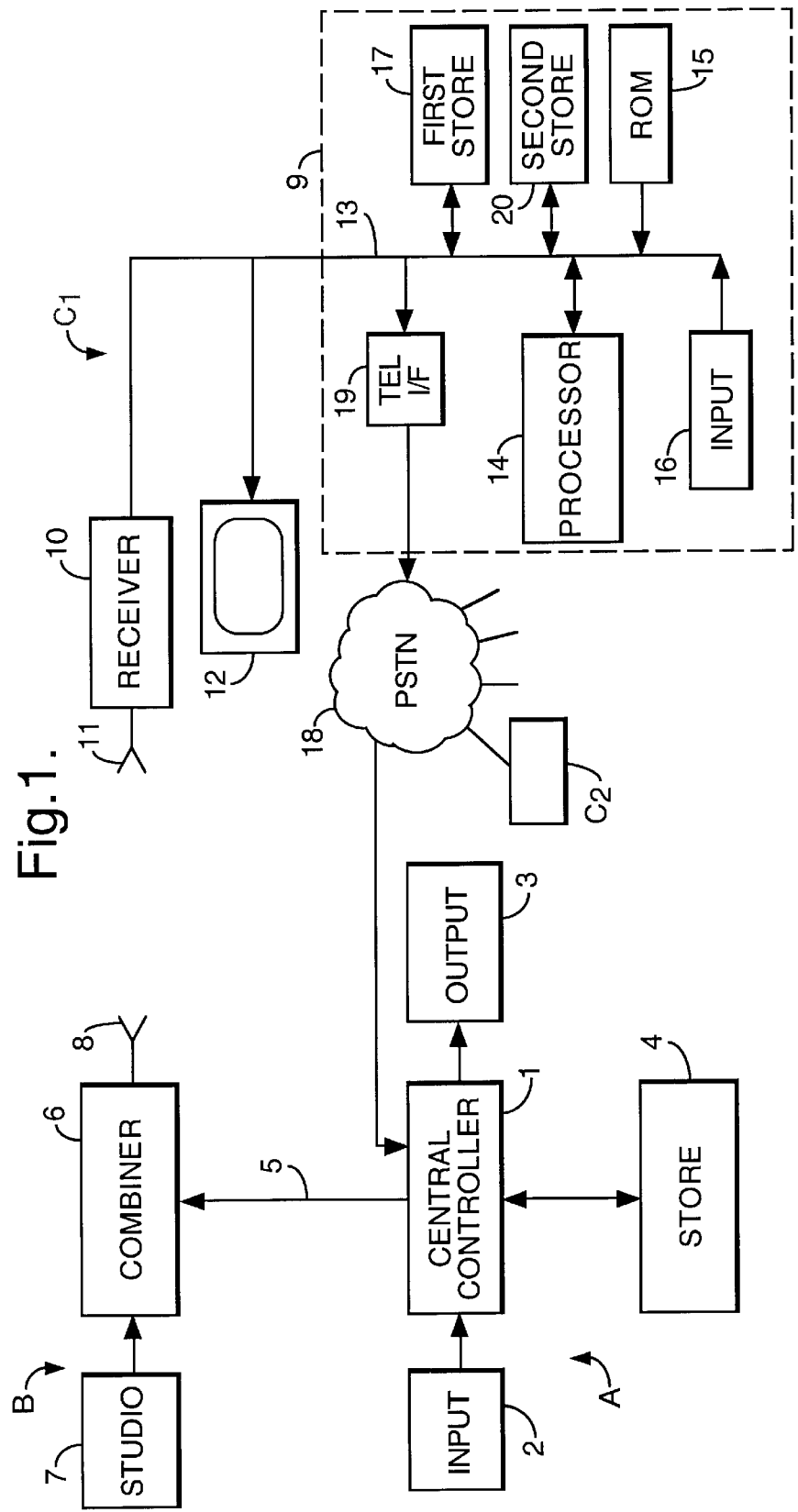
FIG. 1 is a schematic block diagram of the apparatus.

The interactive broadcast network shown in FIG. 1 comprises a game control system A at a central location and including a central controller 1 which will include a computer such as a PC operating a Windows based system, connected to an input device 2 such as a keyboard and/or mouse and the like and to an output device 3 which may include a monitor and/or printer. A store 4 stores data relating to service functions and remote users, which can be accessed and amended by the central controller 1. The central controller 1 generates TV display signals and other control signals associated with various service functions on a land line 5 connected to a combining unit 6 of a TV broadcast system B. The combining unit 6 receives television broadcast signals from a studio 7 which, in the case of a live event, will have originated from outside broadcast cameras, and combines these with the signals on the line 5 so that they are transmitted simultaneously by a transmitter 8 to remote users or players $C_1, C_2$ . . . . The users will typically be remote not only from the system B but also from each other.

The signals supplied to the combiner 6 may be transmitted to the remote units within a vertical blanking interval (VBI) of the normal TV signal or on a separate radio FM-SCA channel or other data format such as a cable modem.

Other forms of transmission including satellite, cable and the internet may also be used to send signals to the remote users C.

Each remote user $C_1, C_2$ . . . , only one shown in FIG. 1, has a home or remote unit 9 constituting a "data source" connected to a television receiver 10 having an aerial 11 and a monitor 12. The home unit 9 includes an address/data bus 13 connected to the receiver 10, the bus 13 being connected to a microprocessor 14, a ROM 15 storing programme instructions for the processor 14, an input device 16 such as a keyboard or mouse, a first store (RAM) 17 for storing data supplied from the central controller 1, and a second signal store (RAM) 20 for storing data defining the identity of the remote unit 9 and the services to which the remote user has subscribed. Signals transmitted by the processor 14 can be communicated to the central controller 1 via a public switched telephone network 18 which is selectively accessed by a telephone interface unit 19 connected to the bus 13. Other media may be used for the return transmission including TV broadcast, cable, satellite and the Internet. In general the return signal medium will be different from the medium used to transmit to the remote user C.

The game control system A can generate data relating to a variety of games some of which may be associated with television broadcasts from the studio 7. For example, one game may allow remote users to predict the occurrence of certain events in a live event being broadcast, such as a live football match. In addition, the game control system A can generate signals to individual or groups of remote units which include data such as operating system upgrades and signals for enabling or disabling certain services.

These functions are described in more detail in EP-A-0873772 and EP-A-0866614 incorporated herein by reference.

Typically, on completion of a game, each remote unit C will have a game score. For example, in the case of a quiz game, this may comprise the number of questions correctly answered. The present invention is concerned with the manner in which these scores can be analysed. Firstly, an initial sampling process is carried out partly under the control of the central controller 1 and partly under the control of the processor 14 in each remote unit C. Each remote unit C stores a local response function in its ROM 15, typically a random number generating function. In this example, it will be assumed that each random number generating function will generate a number in the range 1–10000 which is a local outcome. At the start of a sampling process, the central controller 1 generates a default call-in range or window (step 100, FIG. 2) which, for example, could comprise the range of numbers 1–200 which is essentially selection information. This range is transmitted (step 101) to all remote units C. If a remote unit C has participated in the game, the processor 14 will have performed the random number generating function (step 201) to generate its local outcome, a random number in the range 1–10000. This initial range may be preprogrammed or alternatively supplied to the remote units C at the beginning of a sampling operation as shown by step 200 in FIG. 3. Following performance of the random number generating algorithm (step 201), the remote units C await the receipt of the selection information, the active call-in window (step 202) from the central controller 1 (step 101).

If the remote unit C has participated in the game, upon receipt of the selection information, the active call-in window, the processor 14 determines whether the locally generated random number falls within the active window (step 203). If it does, the processor 14 then returns the local score (step 204) to the central controller 1 using the normal return medium such as the PSTN 18. Alternatively, if the random number locally generated is not within the active window then the processor 14 determines whether it is currently operating in the sampling or iterative phase (step 205) and if in the sampling phase, processing returns to step 202.

Following transmission of the active call-in window in step 101, the central controller 1 then waits for a two minute period (step 102) and then reviews the response level, that is the number of remote units C which have responded because their locally generated random numbers fall within the active call-in window. The central controller 1 determines whether the response level is too low (step 103) and, if so, it increases the active call-in window size (step 104) and it is retransmitted in step 101.

For example, if the initial active call-in window was the range 1–200, this might be increased to 1–400.

If, however, the response level is too high (step 105), the active call-in window is reduced in size (step 106) and the new window size transmitted in step 101. Otherwise, the response level is considered acceptable and processing moves to step 107.

In this iterative phase the scores returned by the remote units are reviewed. In step 107, the central controller 1 selects the 100th best received score and this is transmitted (step 108) to all local units C as a threshold value. When the remote units receive the threshold value (step 206), this is compared with the local score (step 207) and if the score is greater than the threshold, the score is returned to the central controller 1. This return process involves waiting for a short random period (step 208), attempting to call the central controller (step 209), determining a successful connection (step 210) and, if successful, transmitting the score (step 211). If the connection is not successful, processing returns to step 206.

The central controller waits for a period of 45 seconds following transmission of the threshold in step 108 and determines whether any calls have been received (step 109). If they have not, this indicates that the top 100 scores have already been received (step 110) while if scores have been returned then the threshold needs to be reset and processing returns to step 107.

It is desirable for the players at the local units C to find out how they fared in relation to the rest of the playing population. It is not possible for the central controller 1 to transmit a position to each and every participant since not all local remote units will have called in. Following the scoring process, the central controller has a pool of scores from the remote users that have called in. If the size of this pool is increased with truly random scores (those not involved in the iterative scoring procedure) then the collection of scores could be used as a representative cross-section of the playing population's results. Details of this cross-section can be transmitted to the remote users allowing local resolution of each remote user's position relative to the rest of the playing population. This is implemented by dividing the ranked scores into 5% percentile bands. These 20 bands are transmitted to the remote users at the end of the scoring procedure. The local unit can then locally determine which percentile band the user falls into.

It should be noted that the various delays specified in FIGS. 2 and 3 are configurable and that for the sake of simplicity, FIG. 2 ignores the situation in which no scores have been returned upon completion of the two minute period (step 102).

We claim:

1. A method of sampling, at a central location, data generated by a number of remote data sources, the method comprising:
  a) causing remote data sources that have locally generated data for transmission to the central station to implement a local response function that generates a local outcome that is independent of the locally generated data;
  b) transmitting selection information from the central location to all the remote data sources, the selection information relating to the generated local outcome; and
  c) causing remote data sources that have a generated local outcome to determine whether the local outcome satisfies a predetermined relationship with the selection information transmitted from the central location; and, if it does, transmit the locally generated data to the central location.

2. The method according to claim 1, further comprising:
  d) comparing the locally generated data from the data sources at the central location to generate threshold data; transmitting the threshold data from the central location to all the remote data sources which generated data, for comparison with the locally generated data; and the remote data sources transmitting their generated data to the central location if it satisfies a predetermined relationship with the threshold data from the central location.

3. The method according to claim 2, wherein the predetermined relationship is satisfied if the locally generated data exceeds the threshold data.

4. The method according to claim 2, further comprising repeating step d) in response to the most recently received transmitted data until no more data is received at the central station.

5. The method according to claim 1, further comprising determining the number of remote data sources which have transmitted data to the central location; if this number differs from a desired number, transmitting new selection information to all the remote data sources and repeating step c); the new information chosen to result in the number of remote data sources transmitting data being closer to a desired number.

6. The method according to claim 5, wherein the determining step occurs upon completion of a predetermined time period.

7. The method according to claim 1, wherein the local response function is a random number generating function and the local outcome is a random number.

8. The method according to claim 7, wherein step b) comprises transmitting a range of numbers selected from numbers which could be generated by the random number generating function, and step c) comprises determining whether the local outcome random number falls within the transmitted range.

9. The method according to claim 1, wherein the remote data sources generates data as a result of playing a game, the data comprising a game score.

10. The method according to claim 9, wherein the game is played in response to data transmitted from the central location and locally generated instructions.

11. The method according to claim 9, wherein the game is played in association with a TV broadcast.

12. The method according to claim 1, wherein the central location transmits to the remote data sources via a mass broadcast system such as terrestrial or satellite TV, a cable network or the Internet.

13. The method according to claim 1, wherein the remote data sources transmit to the central location via one of the public switch telephone network, the Internet or a dedicated communication line.

14. The method according to claim 1, further comprising:
   d) comparing the locally generated data from the data sources at the central location to generate threshold data; transmitting the threshold data from the central location to all the remote data sources which generated data, for comparison with the locally generated data; the remote data sources transmitting their generated data to the central location if it satisfies a predetermined relationship with the threshold data from the central location; and the central location comparing the transmitted data received at the central location to generate threshold data and transmit the threshold data to all the remote data sources which generated data for comparison with the locally generated data.

15. A method of operating a central station at the central location in the method according to claim 1, wherein the central station transmits selection information from the central location to the remote data sources, the selection information identifying a range of local outcomes generated by respective local response functions.

16. A method of operating a remote data source in the method according to claim 1, wherein the remote data source, in response to having generated data, initiates a local response function to generate a local outcome; receives selection information transmitted from the central location relating to the generated local outcome; determines whether the local outcome satisfies a predetermined relationship with the selection information transmitted from the central location; and, if it does, transmits the generated data to the central location.

17. A central station adapted to carry out a method according to claim 15.

18. A data source adapted to carry out a method according to claim 16.

19. A data generating and sampling system comprising a central station and a number of remote data sources, the system adapted to carry out a method comprising the steps:
   a) causing data sources with locally generated data for transmission to the central station to implement a local response function that generates a local outcome that is independent of the locally generated data;
   b) transmitting selection information from the central station to all the remote data sources, the selection information relating to the generated local outcome; and
   c) causing data sources with a generated local outcome to determine whether the local outcome satisfies a predetermined relationship with the selection information transmitted from the central station, and, if it does, to transmit the locally generated data to the central station.

* * * * *